United States Patent
Oklejas, Jr.

[11] Patent Number: 5,980,114
[45] Date of Patent: Nov. 9, 1999

[54] THRUST BEARING

[76] Inventor: Eli Oklejas, Jr., 444 Ave. De Lafayette, Monroe, Mich. 48162

[21] Appl. No.: 09/032,574

[22] Filed: Feb. 27, 1998

Related U.S. Application Data

[63] Continuation-in-part of application No. 08/789,884, Jan. 20, 1997, abandoned
[60] Provisional application No. 60/038,871, Feb. 28, 1997.

[51] Int. Cl.$^6$ .................................................... F16C 17/04
[52] U.S. Cl. ............................................................ 384/123
[58] Field of Search ..................... 384/123, 124, 384/121, 112, 111

[56] References Cited

U.S. PATENT DOCUMENTS

| | | |
|---|---|---|
| 3,563,618 | 2/1971 | Ivanov . |
| 4,255,081 | 3/1981 | Oklejas et al. . |
| 4,830,572 | 5/1989 | Oklejas, Jr. et al. . |
| 4,966,708 | 10/1990 | Oklejas et al. . |
| 4,983,305 | 1/1991 | Oklejas et al. . |
| 5,049,045 | 9/1991 | Oklejas et al. . |
| 5,082,428 | 1/1992 | Oklejas et al. . |
| 5,106,262 | 4/1992 | Oklejas et al. . |

*Primary Examiner*—Lenard A. Footland
*Attorney, Agent, or Firm*—Lyon & Artz, PLLC

[57] ABSTRACT

An improved thrust bearing has a shaft with a runner coupled to the end of the shaft. The runner has a first sealing face that extends radially from the shaft. A bearing has a fluid passage for supplying fluid to a fluid reservoir. The fluid reservoir may be in the runner or in the bearing. The bearing has a second sealing face opposite the first sealing face of the runner. The first sealing face has a recess that is in fluid communication with the fluid reservoir. Fluid from the fluid reservoir flows into the recess during rotation of the runner. As the shaft and the runner rotates, fluid from the recess deposits between the first sealing face and the second sealing face to lubricate the surface. The recess preferably has a pocket portion and a wedge portion. The wedge portion is in fluid communication with the pocket portion. As the shaft rotates in a predetermined direction, the pocket portion is on the leading edge of rotation of the recess. The pocket is in fluid communication with the fluid reservoir. The wedge reduces in thickness from the pocket to the trailing edge of the recess. The pocket and wedge each contribute to increased resistance of the shaft to axial thrust.

32 Claims, 5 Drawing Sheets

THRUST BEARING

RELATED APPLICATION

This application claims priority to provisional application 60/038,871 filed on Feb. 28, 1997 and is a continuation-in-part of U.S. Pat. application Ser. No. 08/789,884 filed on Jan. 20, 1997, now abandoned, both applications are incorporated by reference herein.

BACKGROUND OF THE INVENTION

The present invention relates to bearings for a rotating assembly, and more specifically to a thrust bearing for counteracting axial thrust acting on a rotating shaft.

Thrust bearings may be used in a wide variety of rotating machinery such as, but not limited to, pumps, turbines and motors. Thrust bearings limit axial movement of the rotating body that is subject to a force acting in a direction parallel to the axis of rotation. Thrust bearings, however, permit the rotation of the rotating body. Sources of axial thrust include the weight of a rotor or pressure differentials within a rotating machine.

One type of thrust bearing is a roller-type. Roller-type thrust bearings use ball or cylindrical bearings to prevent the axial movement of a shaft. This type of bearing, however, is undesirable since they must be machined to highly accurate dimensions and thus are expensive. Roller-type bearings are also prone to failure if minor lubrication contamination or high operating temperatures are experienced.

Another type of thrust bearing is a sliding contact bearing. The rotating portion of the bearing is called the runner and the stationary portion of the sliding contact bearing is called the bearing. A sliding contact bearing uses a lubricant between the bearing and the runner to reduce sliding friction. A fluid film thrust bearing maintains an unbroken film of lubricant between the bearing and the runner to achieve low frictional drag and a low rate of wear. These positive attributes are achieved since the bearings and runner do not come in contact during operation.

There are two basic types of sliding contact thrust bearings; the hydrostatic type and the hydrodynamic type. In prior art FIG. 13, a port 110 through a bearing 112 is used to provide a fluid pressure between bearing 112 and a rotating shaft 114. The fluid pressure within cavity 116 is used to counteract the axial thrust represented by arrow 118. If the axial thrust and the fluid pressure within cavity 116 are in balance, the rotating shaft 114 will not change axial position. During normal operation of rotating machinery, however, the axial force acting on rotor may vary. Thus, the sliding contact thrust bearing of prior art FIG. 13 does not possess the ability to regulate the fluid pressure within cavity 116.

Figure 14:
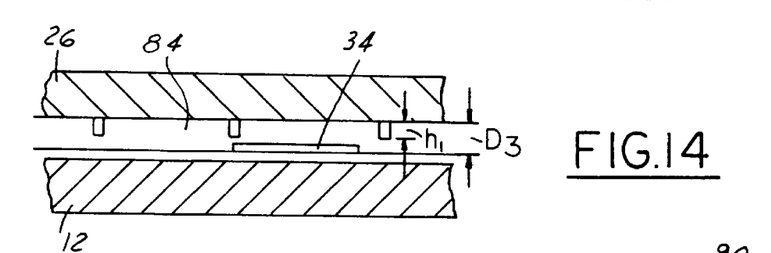
FIG. 14 is a cross-sectional view of the thrust bearing of FIG. 13.

Referring now to prior art FIG. 14, a runner 120 is mounted on the end of rotating shaft 114. An orifice plate 122 is used to regulate the flow of pressure into port 110. Bearing 112 has sealing faces 124 that are directly opposite the runner 120. If an axial force on rotating shaft 114 forces the rotating shaft closer to bearing 112, the increased pressure within cavity 116 will force runner 120 away from sealing surfaces 124. Conversely, if an axial force forces rotating shaft 114 in a direction away from bearing 112, pressure from within cavity 116 will be released between runner 120 and sealing surfaces 124. Orifice plate 122 regulates the flow of fluid into cavity 116. If runner 120 moves a distance away from bearing 112 because of low axial force, then the lubricant flow rate would increase if no orifice plate 112 is present. By limiting the flow of fluid into cavity 116, the pressure in fluid reservoir reduces and causes runner 120 to move toward bearing 112.

Figures 8, 13:
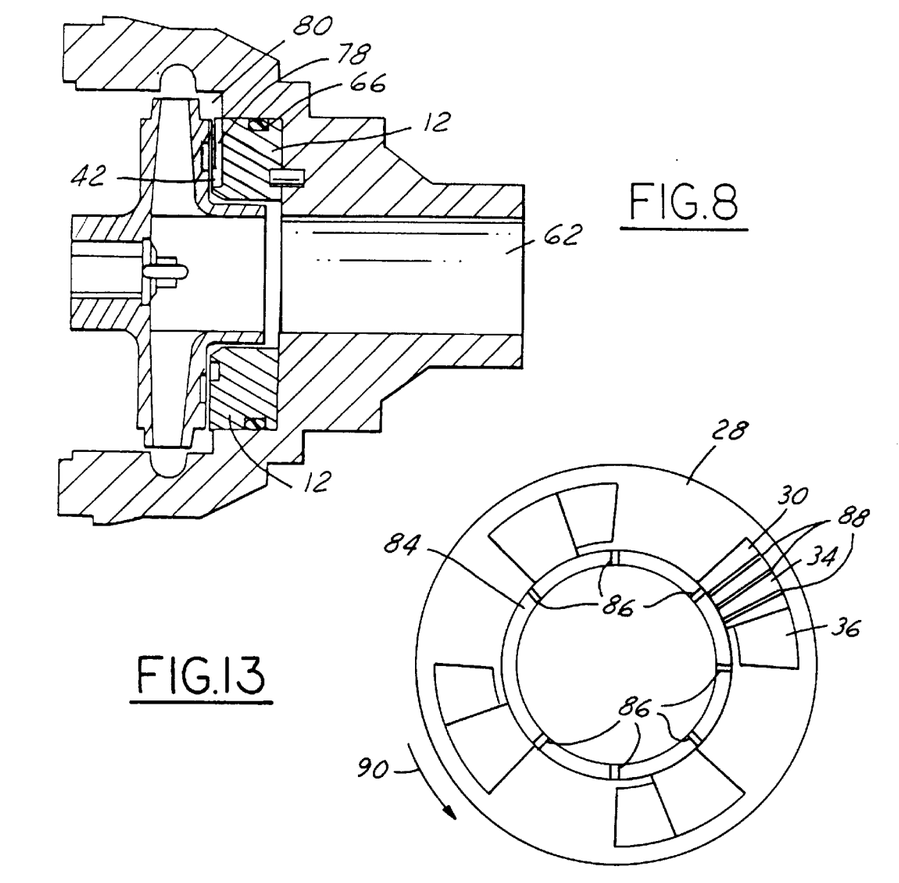
FIG. 8 is a cross-sectional view of a pump having a thrust bearing having alternative configuration for the fluid passage.
FIG. 13 is a cross-sectional view of an alternative embodiment of FIG. 12.

A hydrostatic type sliding contact thrust bearing such as that illustrated in prior art FIGS. 13 and 14 are not suitable for certain rotating machine applications such as pumps or turbines since a flow passage must be provided through the center of the bearing.

Figure 15:
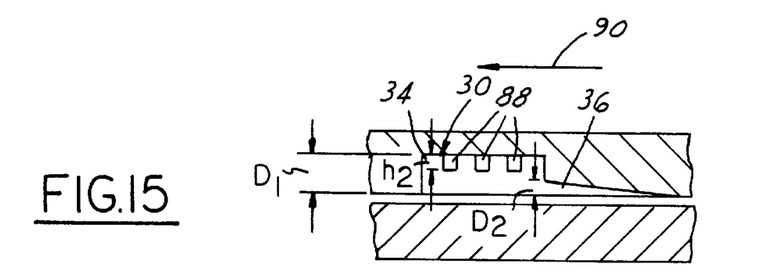
FIG. 15 is a cross-sectional view of FIG. 13 through a pocket and wedge.

Referring now to prior art FIG. 15, a hydrodynamic bearing is illustrated. In this embodiment, a bearing 126 has a tapered channel 128 filled with fluid represented by arrows 130. A runner 132 rotates in a direction represented by arrow 134. Axial force is represented by arrow 136. As runner 132 rotates in the direction of arrow 134, fluid is drawn out of tapered channel 128 into the gap 138 between runner 132 and bearing 126. Essentially, the fluid represented by arrows 130 is dragged from tapered channel 128 by the surface of runner 132. The pressure in the tapered channel increases with the speed of the runner, with decreasing clearance between runner 132 and bearing 126, and by increasing the viscosity of the fluid.

Figure 16:
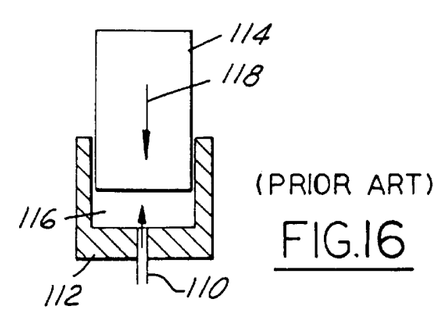
FIG. 16 is a cross-sectional view of a simple hydrostatic-type thrust bearing.
Figure 17:
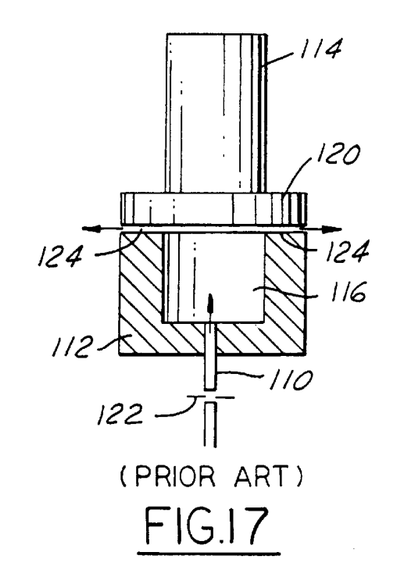
FIG. 17 is a cross-sectional view of an improved hydrostatic thrust bearing.
Figure 18:
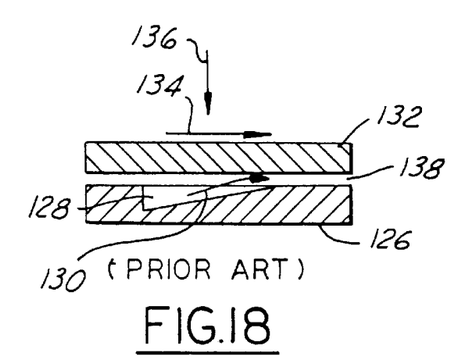
FIG. 18 is a cross-sectional view of a wedge in a bearing surface; and Prior art
Figure 19:
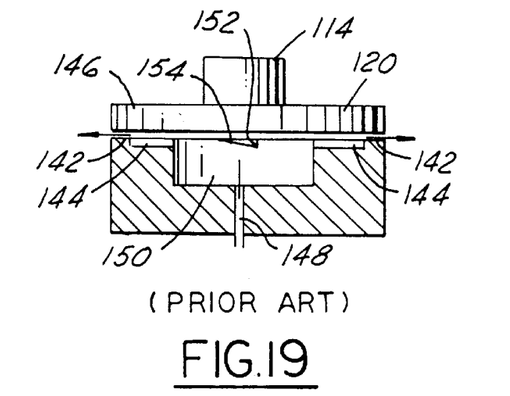
FIG. 19 is a cross-sectional view of a thrust bearing utilizing hydrostatic forces.

Referring now to prior art FIG. 16, bearing surface 142 contains tapered channels 144 such as that shown in prior art FIG. 15. As runner 146 rotates near bearing surface 142, fluid is provided by port 148 to cavity 150 and into tapered channel 144. Tapered channels 144 are in fluid communication with the cavity 150 to provide a source of fluid into tapered channels 144 to maintain a supply of fluid on bearing surface 142. In this configuration, the deep portion is represented by 152, and the shallow portion of tapered channel 144 is represented by 154. The direction of rotation of runner 146 in this configuration is in the counterclockwise direction.

In certain situations each of the configurations shown do not provide sufficient lubrication between the runners and the bearings. The inadequate lubrication reduce the life of the thrust bearing. Further, neither of the configurations shown provide for a flow passage through the center of the bearing. Many pumps require an axial flow passage through the center of the bearing.

It would therefore be desirable to provide an improved thrust bearing which provides increased lubrication between a rotating runner and a bearing and which further has the capability of being adapted to accommodate a flow passage through the center of the bearing.

SUMMARY OF THE INVENTION

It is therefore an object of the invention to provide an improved construction for a thrust bearing.

A thrust bearing is provided that has a shaft with a runner coupled to the end of the shaft. The runner has a first sealing face. A bearing has a fluid passage for supplying fluid to a fluid reservoir. The fluid reservoir may be in the runner or in the bearing. The bearing has a second sealing face opposite the first sealing face of the runner. The first sealing face has a recess that is in fluid communication with the fluid reservoir. Fluid from the fluid reservoir flows into the recess during rotation of the runner. As the shaft and the runner rotates, fluid from the recess deposits between the first sealing face and the second sealing face to lubricate the surface.

One feature of the invention has a recess with a pocket portion and a wedge portion. The wedge portion is in fluid communication with the pocket portion. The shaft rotates in a predetermined direction. The pocket portion is on the leading edge of rotation of the recess and is in fluid communication with the fluid reservoir. The wedge reduces in thickness from the pocket to the trailing edge of the recess.

Another feature of the invention is that the fluid reservoir may be located on the runner of the bearing. If located on the runner, a centrifugal force acts on the fluid within the reservoir. The centrifugal force provides an additional force to counteract axial thrust since the fluid can only escape between the runner and the bearing or into the recess.

One advantage of the pocket and wedge configuration for the recess is that improved bearing characteristics have been achieved to extend the life of the bearing. Forces are developed in both the wedge and the pocket to counteract axial thrust.

In another aspect of the invention, a method for operating a thrust bearing comprises the steps of: rotating a shaft having a runner with a plurality of recesses adjacent to a bearing surface; forcing a fluid into a fluid reservoir; fluidically coupling the plurality of recesses to the fluid reservoir; forcing the fluid into the recesses of the runner; and, developing a force within the recess of the runner to counteract an axial force on the shaft.

One feature of the method for operating the thrust bearing is developing a centrifugal force on the fluid in the recess of the runner that creates a pressure in the recess greater than the pressure in the fluid reservoir. Thus, as the shaft rotates, the axial thrust increases. As the shaft rotates faster, the centrifugal force in the fluid increases which develops a greater pressure within the recess.

The hydrodynamic effect is also utilized by a wedge on the trailing edge of the recess. The leading edge of the recess tapers to the trailing edge of the wedge which joins the surface of the runner. Fluid that enters the wedge creates a hydrodynamic force between the runner and the bearing surface. A hydrostatic force is also developed between the fluid reservoir and the surface of the runner.

Another advantage of the present invention is an improved thrust bearing has been developed to counteract an axial thrust acting on a rotating shaft. By harnessing the centrifugal force of the fluid, the hydrodynamic force between the wedge and the bearing surface and the hydrostatic force between the fluid reservoir and the runner. A greater axial thrust than that of prior thrust bearings may be counteracted.

To further increase the hydrodynamic forces and centrifugal forces, and thus increase the capacity of the thrust bearing, steps are included within the annular fluid reservoir. Also, ribs are included within the pocket of the recess. The steps and ribs generate a turbulent flow within the annular fluid reservoir and pocket.

BRIEF DESCRIPTION OF THE DRAWINGS

Other features and advantages of the present invention will become apparent from the detailed description which should be read in conjunction with the drawings in which.

Prior art

Prior art

Prior art

DETAILED DESCRIPTION OF THE PREFERRED EMBODIMENT

Referring now to the drawings, like reference numerals are used to identify identical components in the various views. Although the invention will be illustrated in the context of a pump, it will be appreciated that this invention may be used with other rotating machines requiring thrust bearings to counteract axial forces acting on the rotating shaft.

Figure 1:
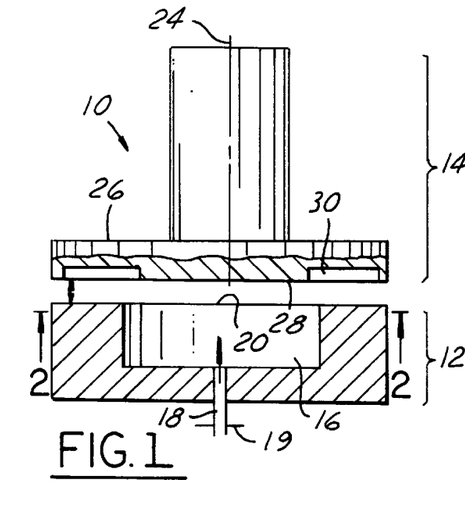
FIG. 1 is a cross-sectional view of an improved thrust bearing according to the present invention.

Referring now to FIG. 1, a thrust bearing 10 is shown having a bearing 12 and a rotor 14 which are separated by a gap g. Typically, the bearing 12, which is sometimes called a thrust plate, is separated from rotor 14 by a fluid in gap g. The fluid is not shown for simplicity.

Bearing 12 has a fluid reservoir 16 formed therein that holds the fluid to be applied within gap g. A fluid passage 18 in bearing 12 provides a means for introducing fluid within fluid reservoir 16. Bearing 12 also has a sealing surface 20 which is adjacent to and preferably surrounds fluid reservoir 16.

An orifice plate 19 may be incorporated in fluid passage 18 to regulated the pressure within fluid reservoir 16. Orifice plate 19 prevents an excessive gap from developing between rotor 14 and bearing 12 during, low thrust periods. Orifice plate 19 restricts the pressure increase which would normally occur during low thrust periods absent the orifice plate 19. Fluid reservoir 16 develops a lower pressure due to the flow restriction into fluid reservoir 16 and consequently rotor 14 is drawn toward bearing 12 during low thrust.

Rotor 14 has a rotating shaft 22 that rotates about axis 24. Rotor 14 has a runner 26 that extends radially from rotating shaft 22. Runner 26 has a sealing surface 28 that is opposite sealing surface 20 of bearing 12. Sealing surface 28 has a plurality of recesses 30 formed therein. Recesses 30 extend in an axial direction into runner 26. Recesses 30 are in fluid communication with fluid reservoir 16.

Figure 2:
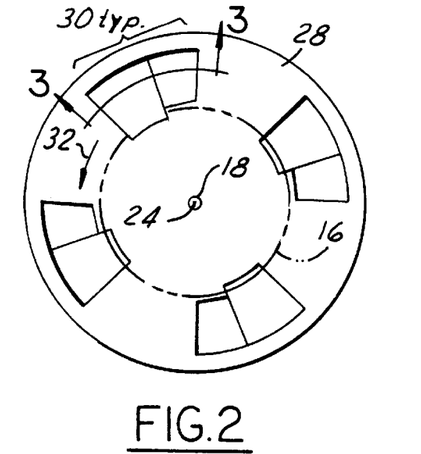
FIG. 2 is a cross-sectional view through the bearing showing the face of the runner of FIG. 1.
Figure 3:
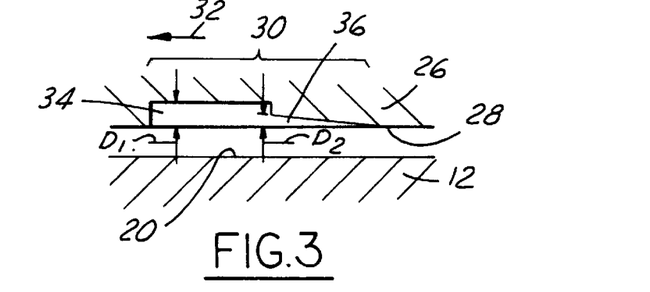
FIG. 3 is a cross-sectional view of a recess in the runner of FIG. 2.

Referring now to FIGS. 2 and 3, sealing surface 28 of runner 26 is shown having four recesses 30. The number of recesses 30 may vary depending on the application. Fluid reservoir 16 and fluid passage 18 are shown in phantom lines to illustrate the alignment of rotor 14 with respect to bearing 12. Rotor 14 rotates about axis 24 in a counterclockwise direction shown by arrow 32. Recesses 30 each have a pocket 34 and a wedge portion 36. Pocket 34 is on the leading edge of rotation of recess 30, while wedge portion 36 is on the trailing edge of recess 30. Pocket 34 is in fluid communication with fluid reservoir 16. Pocket 34 extends in a radial direction between a radius just shorter than the radius of fluid reservoir 16 to a radius less than the radius of the runner 26. Wedge portion 36 extends in a radial direction from a radius greater than the radius of fluid reservoir 16 to less than the radius of runner 26. As is best shown in FIG. 3, pocket 34 preferably extends to a depth $D_1$ within runner 26. Wedge portion 36 extends from the trailing portion of pocket 34 and angles to meet sealing surface 28. Sealing surface 28 is adjacent to three edges of the wedge 36. The leading edge of wedge portion 36 preferably has a depth $D_2$ which is less than the depth of $D_1$ of pocket 34.

Figure 4:
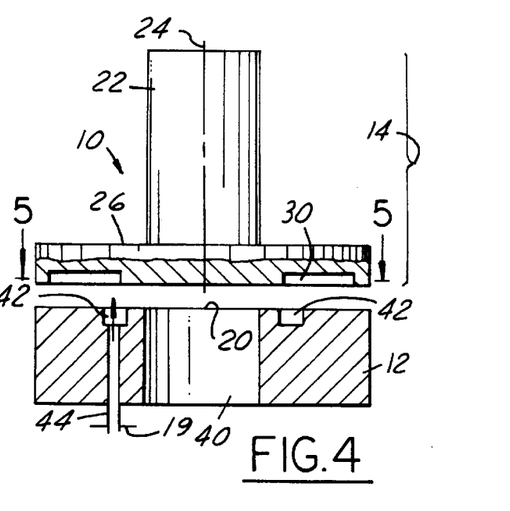
FIG. 4 is a cross-sectional view of a thrust bearing having a central passage according to the present invention.
Figure 5:
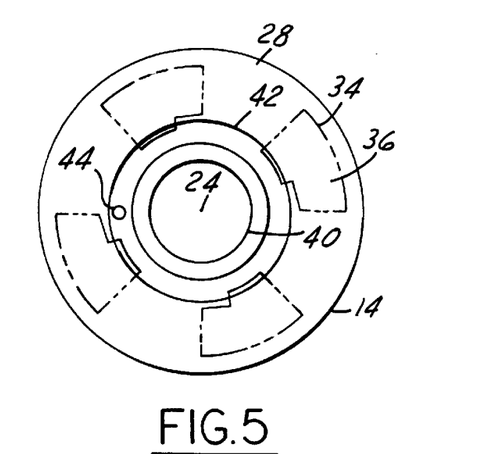
FIG. 5 is a cross-sectional view through the runner showing the bearing of FIG. 4.

Referring now to FIGS. 4 and 5, an alternative configuration for thrust bearing 10 is shown. In this configuration, a passage 40 is located through the center of bearing 12. Passage 40 is required in many rotating machine applications such as a pump in which flowthrough is required. Bearing 12 has an annular reservoir 42 for holding fluid for lubrication. Fluid is provided to annular reservoir 42 by a fluid passage 44. Fluid passage 44 preferably extends through bearing 12. In the preferred embodiment, only one fluid passage 44 is required to provide a sufficient supply of fluid to annular reservoir 42. Annular reservoir 42 is in fluid communication with pocket 34.

In operation of both of the previously set forth embodiments, several forces act to prevent axial thrust acting on rotating runner 26 from causing contact with bearing 12. Fluid from within the fluid reservoirs are communicated into pocket 34. As rotor 14 rotates, a centrifugal force acts on the fluid in the pocket 34. The centrifugal force forces the fluid within pocket 34 outwardly against the outwardmost wall of pocket 34. The rotating motion of the rotor thus creates a pressure within pocket 34 greater than the pressure in the fluid reservoir. This increased pressure allows the thrust bearings to counteract any axial thrust on runner 26. As the rotor speed increases, more axial thrust is likely and thus the pressure also increases within pocket 34. As the rotor slows, the fluid pressure from centrifugal force on the fluid is reduced.

Wedge portions 36 receive fluid from pocket 34. The wedge creates a hydrodynamic force. As fluid is forced into the decreasing clearance of wedge portion 36, the pressure increases within the wedge portion 36 to provide an additional force to resist an axial thrust acting on rotor 14. Because wedge portion 36 is also rotating, an additive centrifugal force is caused from the fluid rotating within wedge portion 36.

A hydrostatic force also acts on the rotor 14. The hydrostatic pressure acts between the fluid reservoir and the sealing surface 20 of bearing 12 and the sealing surface of runner 26. The three pressures add together to provide resistance against axial thrust acting on rotor 14.

Figure 6:
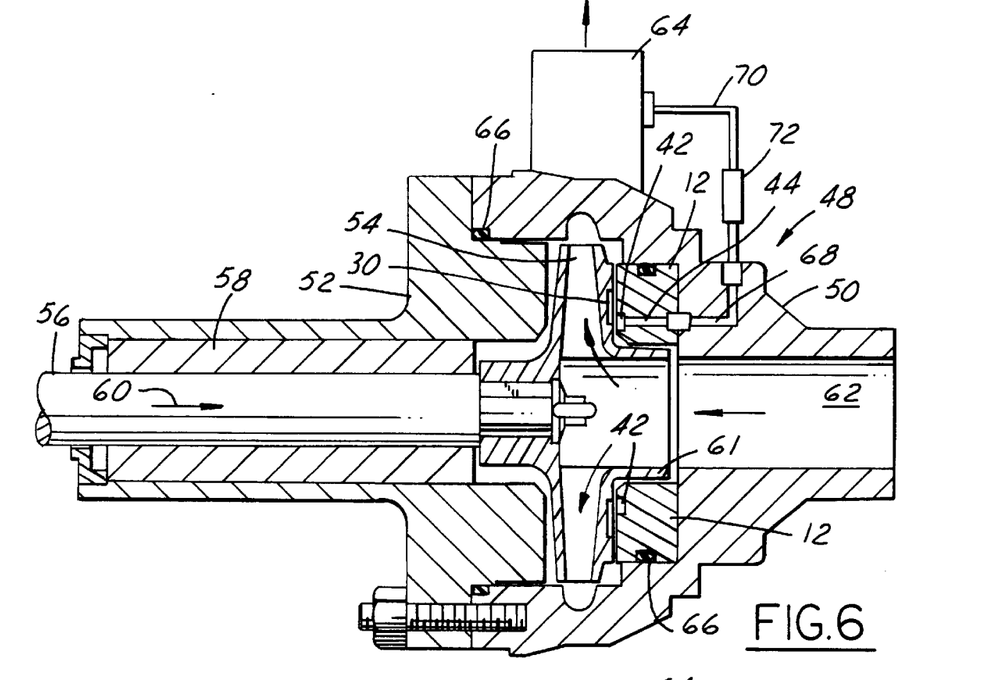
FIG. 6 is a cross-sectional view of a pump having a thrust bearing according to the present invention.

Referring now to FIG. 6, a pump 48 is illustrated having a casing 50. A casing 50 and bearing housing 52 encloses an impeller 54. Impeller 54 is mounted within casing 50 and bearing housing 52 supported by a shaft 56. A bearing 58 permits rotational motion between shaft 56 and bearing housing 52. Bearing 58 merely prevents shaft 56 from moving radially, but does not provide resistance to axial thrust represented by arrow 60.

Casing 50 has an inlet 62 and an outlet 64. The rotation of impeller 54 provides the fluid entering inlet 62 with an increased velocity. A plurality of seals 66 prevent the fluid entering inlet 62 from escaping between casing 50 and bearing housing 52.

The thrust bearing is configured like the thrust bearing illustrated in FIG. 4. A bearing 12 is located within casing 50. Bearing 12 has an annular reservoir 42 formed therein. Fluid passage 44 is in communication with annular reservoir 42. Fluid passage 44 is connected to a fluid passage 68 formed within casing 50. Fluid passage 68 is coupled to an impeller discharge passage 70 on the outlet 64 of the pump 48. Because the fluid in the outlet 64 is at a higher pressure than any other place in the pump, fluid is carried through impeller discharge 70 into fluid passage 68 through fluid passage 44 and into annular reservoir 42.

Impeller 54 acts as runner 26 illustrated in FIGS. 1 and 4. Impeller 54 has a number of pockets 34 and wedge portions 36 as illustrated in FIG. 5. The fluid in annular reservoir 42 acts as a lubricant between impeller 54 and bearing 12. Because the axial thrust imposed on the shaft 56 is generated by the same pressure that pressurizes the annular reservoir 42 of the thrust bearing, sufficient pressure will always be available to counteract axial thrust 60. Wear rings 61 may be incorporated as part of impeller 54 to prevent wear in areas not fluidically protected by the lubricating fluid between the bearing and the runner. Wear ring 61 with a close clearance to the housing reduces leakage of high pressure fluid from the impeller discharge back into inlet 62.

An orifice plate 72 may be provided in impeller discharge passage 70 to regulate the pressure provided to annular reservoir 42.

The configuration shown in FIG. 6 is best suited for applications in which axial thrust 60 is provided in only one direction.

Figure 7:
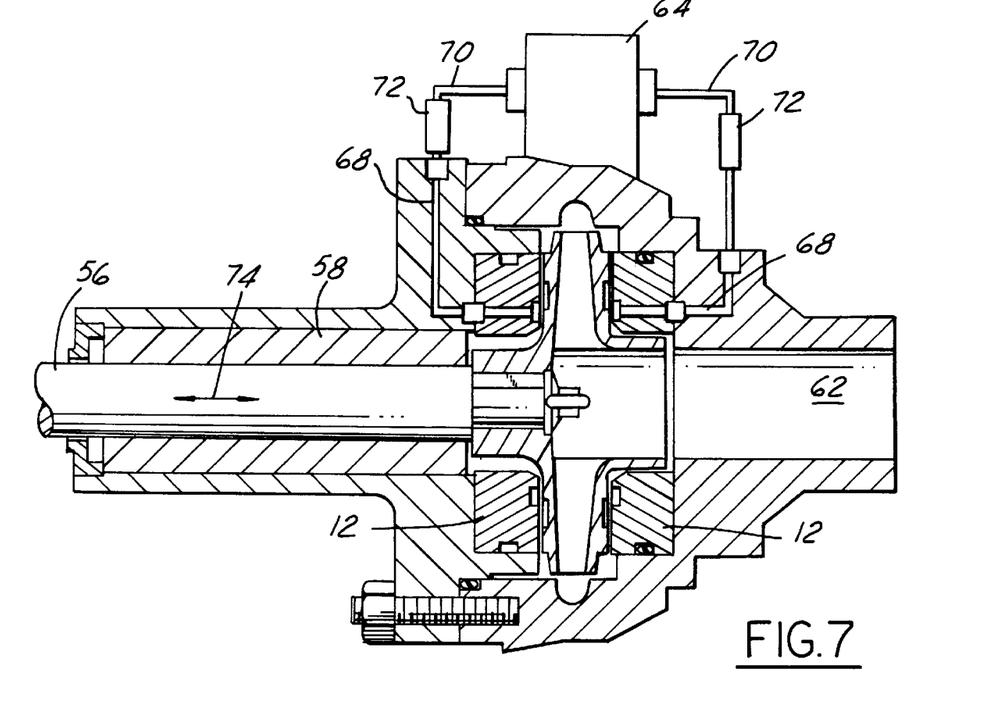
FIG. 7 is a cross-sectional view of a pump having a pair of thrust bearings according to the present invention.

Referring now to FIG. 7, axial thrust represented by arrow 74 may act in two directions. In this embodiment, a second set of bearings 12 are provided. A second fluid passage 68, a second impeller discharge 70 and a second orifice plate 72 are also provided. In this embodiment, impeller 54 has a second set of pockets 34 and wedge portions 36. Thus, the axial thrust of shaft 56 may be balanced in either axial direction.

Referring now to FIG. 8, a partial cross-sectional view of a pump is shown having a bearing 12 that has a slightly modified fluid passage 78 from that of FIGS. 4. Fluid passage 78 eliminates the need for the impeller discharge passages shown as 70 in FIGS. 6 and 7. The fluid contained in impeller discharge region is at a relatively high pressure. Fluid passage 78 extends from annular reservoir 42 in a radial direction through bearing 12 and through the outer diameter of the bearing to provide a passage from impeller discharge region 80. This arrangement provides the advantage of eliminating impeller discharge passage tubing 70 which is particularly useful if the pump will be placed in areas with small clearances.

Figure 9:
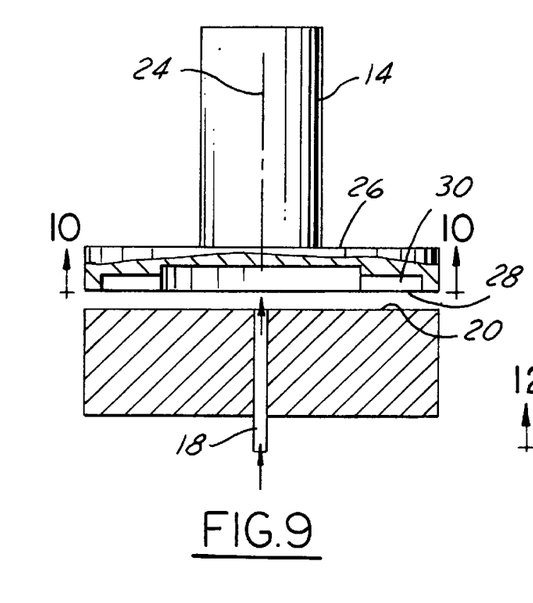
FIG. 9 is a cross-sectional view of an alternative embodiment of an improved thrust bearing according to the present invention.
Figure 10:
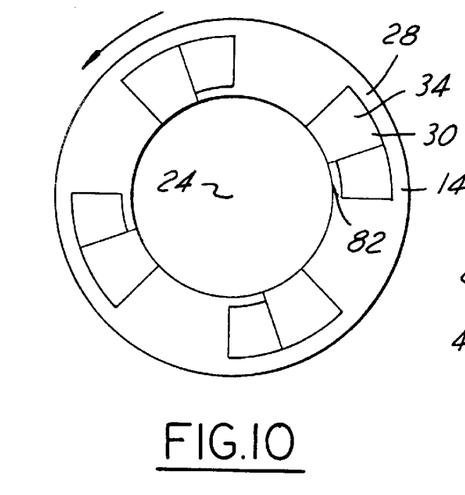
FIG. 10 is a cross-sectional view through the runner of FIG. 9.

Referring now to FIGS. 9 and 10, a similar embodiment to that of FIGS. 1 and 2 except that a runner fluid reservoir 82 in runner 26 replaces the fluid reservoir 16 in bearing 12 and fluid passage 18 extends to sealing surface 20 of bearing 12. Runner fluid reservoir 82 is preferably concentric with rotor 14. Runner fluid reservoir 82 is in fluid communication with fluid passage 18 in bearing 12. As in the previous embodiments, the deep portion of the wedge is adjacent to pocket 34. Wedge portion 36 tapers to the trailing edge where it meets sealing surface 28. Sealing surface 28 of runner 26 is adjacent to wedge portion 36 on three sides.

Because runner fluid reservoir 82 rotates with runner 26, an additional force to those described with respect to FIGS. 1 and 2 counteract axial thrust on rotor 14. That is, a centrifugal force acts on the fluid within runner fluid reservoir 82 that forces fluid to the outward most radial extent of runner fluid reservoir 82. Thus, an increased pressure rise is developed within runner reservoir 82 that acts to counteract axial force on runner 26.

Figure 11:
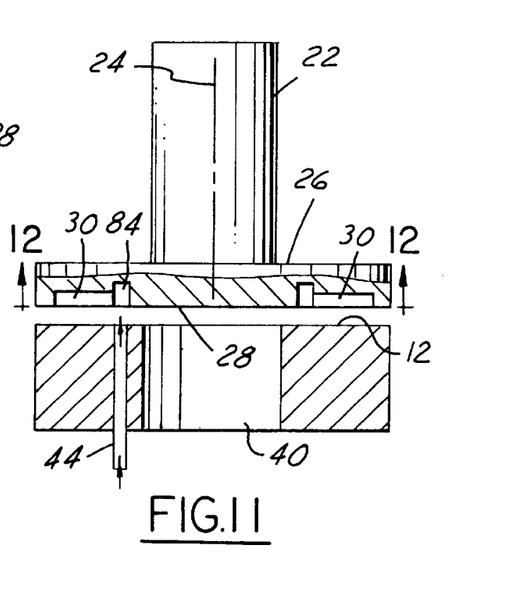
FIG. 11 is a cross-sectional view of an alternative embodiment of a thrust bearing having a central passage according to the present invention.
Figure 12:
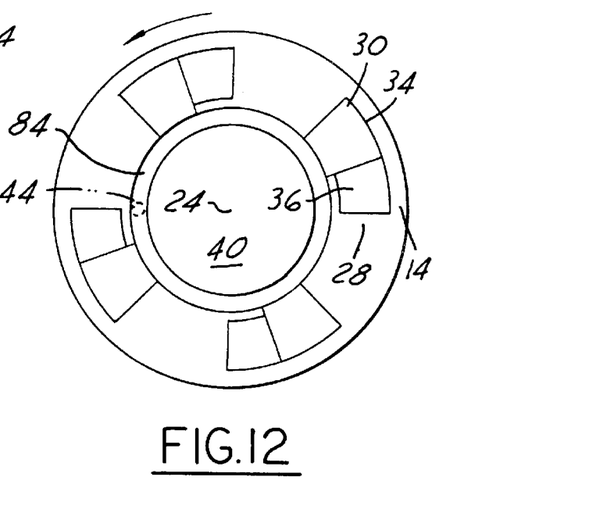
FIG. 12 is a cross-sectional view through the runner of FIG. 11.

Referring now to FIGS. 11 and 12, a similar embodiment to that of FIGS. 4 and 5 except that an annular runner fluid reservoir 84 in runner 26 replaces fluid reservoir 42 in bearing 12. Fluid passage 44 is in fluid communication with annular runner fluid reservoir 84. Annular runner fluid reservoir 84 is concentric with rotor 14. Centrifugal forces are also developed in the annular runner fluid reservoir 84 that increases the pressure within annular runner fluid reservoir 84 and increases the resistance of runner 26 to axial thrust.

The embodiments shown in FIGS. 9 through 12 are relatively easy to manufacture since only runner 26 is machined. The fluid reservoir may be machined at the same time as the wedges and pockets. Because the bearing is made of softer material than the runner, eliminating the groove increases the strength of the bearing.

One skilled in the art would recognize that the FIGS. 6 through 8 may be modified to incorporate the thrust bearings of FIGS. 9 through 12.

Referring now to FIG. 13, annular fluid reservoir 84 is located in runner 26. Recesses 30 have pockets 34 and wedges 36. Pockets 34 are in fluid communication with annular fluid reservoir 84. Pockets 34 are also in fluid communication with wedge portion 36, similarly to that described above with reference to FIG. 12. To increase the bearing capacity, it has been found that turbulent fluid within annular fluid reservoir 84 and turbulent fluid within pockets 34 increase the bearing capacity. To help generate a turbulent flow within annular reservoir 84, a plurality of steps 86 are spaced therein.

Referring now to FIGS. 13 and 14, steps 86 preferably have a height $H_1$ which is less than depth $D_3$ of annular fluid reservoir 86. Steps 86 may be formed of a similar material to that of runner 26. Steps 86 preferably extend across annular fluid reservoir and extend in a radial direction with respect to runner 26.

Referring now to FIGS. 13 and 15, to increase the turbulent flow of fluid in pocket 34, a plurality of ribs are placed therein. As illustrated, three ribs 88 are placed within each pocket 34. Of course, other numbers of ribs may be sufficient. Ribs 88 preferably extend in a radial direction with respect to number 26. Ribs 88 preferably have the height $H_2$ which is less than the depth $D_1$ and which is less than the height of the trailing edge of pocket 34 adjacent wedge 36.

In operation, as runner 26 rotates in the direction indicated by arrow 90, both ribs 88 and steps 86 create a turbulent flow of the fluid within annular fluid reservoir 84 and pocket 34. The turbulent flow within pocket 34 is also transmitted into the wedge portion 36. The circular motion of the lubricant is intensified by steps 86 and ribs 88. The hydrodynamic force developed in the wedge is enhanced by the turbulent flow entering wedge 36.

In this embodiment, ribs 88 within pocket 34 increase the centrifugal force acting on the lubricant in pockets 34. The hydrodynamic effect in wedge 36 is also increased by the presence of steps 86 and ribs 88 since a turbulent flow is provided to wedge 36.

While the best mode for carrying, out the present invention has been described in detail, those familiar with the art to which this invention relates will recognize various alternative designs and embodiments for practicing the invention as defined by the following claims:

What is claimed is:

1. A thrust bearing assembly comprising:

a shaft;

a runner fixedly coupled to said shaft, said runner having a first sealing face;

a fluid reservoir;

a bearing having a fluid passage therein for supplying fluid to said fluid reservoir, said bearing having a second sealing face adjacent said first sealing face;

said first sealing face having a recess in fluid communication with said fluid reservoir, said recess having a pocket in fluid communication with said reservoir and a wedge portion in fluid communication with said pocket portion.

2. A thrust bearing assembly as recited in claim 1 wherein said shaft rotates in a predetermined direction, said wedge portion is located adjacent a trailing edge of said pocket.

3. A thrust bearing assembly as recited in claim 1 wherein said fluid reservoir has a generally cylindrical shape, said cylindrical shape concentric with said shaft.

4. A thrust bearing assembly as recited in claim 1 wherein bearing contains a flow passage therethrough.

5. A thrust bearing assembly as recited in claim 1 wherein said fluid reservoir is annular in shape.

6. A thrust bearing assembly as recited in claim 5 wherein said fluid reservoir is located in said runner; said fluid reservoir having a plurality of steps therein.

7. A thrust bearing assembly as recited in claim 6 wherein said fluid reservoir has a depth; said steps having a height less than said depth.

8. A thrust bearing assembly as recited in claim 1 further comprising a plurality of ribs within said pocket.

9. A thrust bearing assembly as recited in claim 8 wherein said ribs have a height less than a height of an edge of said pocket adjacent said wedge.

10. A thrust bearing assembly as recited in claim 1 wherein said bearing has a flow passage therethrough, said fluid reservoir is a concentric flow passage.

11. A thrust bearing assembly machine as recited in claim 1 wherein said fluid reservoir is formed in said first sealing face.

12. A thrust bearing assembly as recited in claim 1 wherein said fluid reservoir is formed in said second sealing face.

13. A rotary machine comprising:

a casing;

a shaft rotatably coupled within said casing;

an impeller located on said shaft, said impeller having a first sealing face with a recess formed therein; and a thrust bearing assembly coupled to said shaft, said thrust bearing assembly having a runner fixedly coupled to said shaft, said runner having a first sealing face;

a fluid reservoir;

a bearing having a fluid passage therein for supplying fluid to said fluid reservoir, said bearing having a second sealing face adjacent said first sealing face;
said first sealing face having a plurality of recess in fluid communication with said fluid reservoir,
each of said plurality of recesses having a pocket in fluid communication with said reservoir and a wedge portion in fluid communication with said pocket portion.

14. A rotary machine as recited in claim 13 wherein said shaft rotates is a predetermined direction, said wedge portion is located adjacent a trailing edge of said pocket.

15. A rotary machine as recited in claim 13 wherein said fluid passage is fluidically coupled to an impeller discharge passage through an external tube.

16. A rotary machine as recited in claim 13 wherein said fluid passage is fluidically coupled to an impeller discharge region within said casing through said bearing.

17. A rotary machine as recited in claim 13 wherein said fluid reservoir having a generally cylindrical shape, said cylindrical shape concentric with said shaft.

18. A rotary machine as recited in claim 13 wherein bearing contains a flow passage therethrough.

19. A rotary machine as recited in claim 13 wherein said fluid reservoir is annular in shape.

20. A thrust bearing assembly as recited in claim 19 wherein said fluid reservoir is located in said runner; said fluid reservoir having a plurality of steps therein.

21. A thrust bearing assembly as recited in claim 20 wherein said fluid reservoir has a depth; said steps having a height less than said depth.

22. A thrust bearing assembly as recited in claim 13 further comprising a plurality of ribs within said pocket.

23. A thrust bearing assembly as recited in claim 22 wherein said ribs have a height less than a height of an edge of said pocket adjacent said wedge.

24. A method of operating a thrust bearing as recited in claim 23 further comprising the step of forcing a fluid into said fluid reservoir through a fluid passage.

25. A method of operating a thrust bearing as recited in claim 23 further comprising the step of coupling said fluid passage to a high pressure area with a pump housing.

26. A method of operating a thrust bearing as recited in claim 23 further comprising the step of coupling said fluid passage to an impeller discharge passage.

27. A rotary machine as recited in claim 13 wherein said bearing has a flow passage therethrough, said fluid reservoir is concentric flow passage.

28. A rotary machine as recited in claim 13 wherein said fluid reservoir is formed in said first sealing face.

29. A rotary machine as recited in claim 13 wherein said fluid reservoir is formed in said second sealing face.

30. A method of operating a thrust bearing assembly comprising the steps of:
rotating a shaft having a runner with a plurality of recesses formed therein;
forcing a fluid into a fluid reservoir;
fluidically coupling the plurality of recesses to the fluid reservoir;
forcing the fluid into the recesses of the runner;
developing a centrifugal force on fluid in the recesses in the runner that creates a pressure in the recess greater than the pressure in the fluid reservoir;
developing a hydrodynamic force within a wedge of the recesses in the runner that creates a pressure in the recess greater than the pressure in the fluid reservoir; and
developing a hydrostatic force between the runner and the bearing surface.

31. A method of operating a thrust bearing as recited in claim 30 further comprising the step of developing a turbulent flow of fluid in a the recess with a plurality of ribs in the pocket.

32. A method of operating a thrust bearing as recited in claim 30 further comprising the step of developing a turbulent flow of fluid in a fluid reservoir with a plurality of steps in the fluid reservoir.

* * * * *